United States Patent [19]

Komai et al.

[11] Patent Number: 4,626,990
[45] Date of Patent: Dec. 2, 1986

[54] ELECTRONIC CASH REGISTER

[75] Inventors: Kensaku Komai, Yamatokooriyama; Fusahiro Shiono, Habikino, both of Japan

[73] Assignee: Sharp Kabushiki Kaisha, Osaka, Japan

[21] Appl. No.: 514,038

[22] Filed: Jul. 15, 1983

[30] Foreign Application Priority Data

Jul. 27, 1982 [JP] Japan .................. 57-131804

[51] Int. Cl.[4] .................................. G06F 15/20
[52] U.S. Cl. ....................... 364/405; 364/900
[58] Field of Search .............. 364/404, 405, 406; 364/900 MS File, 200 MS File

[56] References Cited

U.S. PATENT DOCUMENTS

| | | | |
|---|---|---|---|
| 4,138,733 | 2/1979 | Tadakoma et al. | 364/900 |
| 4,142,235 | 2/1979 | Tadakoma et al. | 364/405 |
| 4,159,533 | 6/1979 | Sakurai | 364/900 |
| 4,312,037 | 1/1982 | Yamakita | 364/405 |
| 4,317,172 | 2/1982 | Nakamo | 364/405 |
| 4,319,326 | 3/1982 | Uchida | 364/405 |
| 4,360,872 | 11/1982 | Suzuki et al. | 364/405 |
| 4,408,292 | 10/1983 | Nakatani et al. | 364/405 |
| 4,484,277 | 11/1984 | Uesugi | 364/405 |

Primary Examiner—Eddie P. Chan
Assistant Examiner—Jonathan C. Fairbanks
Attorney, Agent, or Firm—Birch, Stewart, Kolasch & Birch

[57] ABSTRACT

An electronic cash register inhibits registration of information associated with a commodity unless an operator code comprised of a plurality of digits and identifying an operator is inputted. A preset code further allows selection of the manner of indicating and printing the inputted operator code. When an operator code comprised of a plurality of digits is entered by operating a decimal keyboard or ten-key (1) and an operator code key and when a first mode is set through a mode selection key (7), all the digits of the operator code are displayed in a display (11) and printed in a printer (12). If and when a second mode is set, only a predetermined partial digit or digits of the operator code comprised of a plurality of digits are printed and none of digits are displayed. If a third mode is set, both displaying and printing of the operator code are inhibited. Thus, a user can arbitrarily select whether the operator code should be displayed and printed, by switching the mode.

2 Claims, 4 Drawing Figures

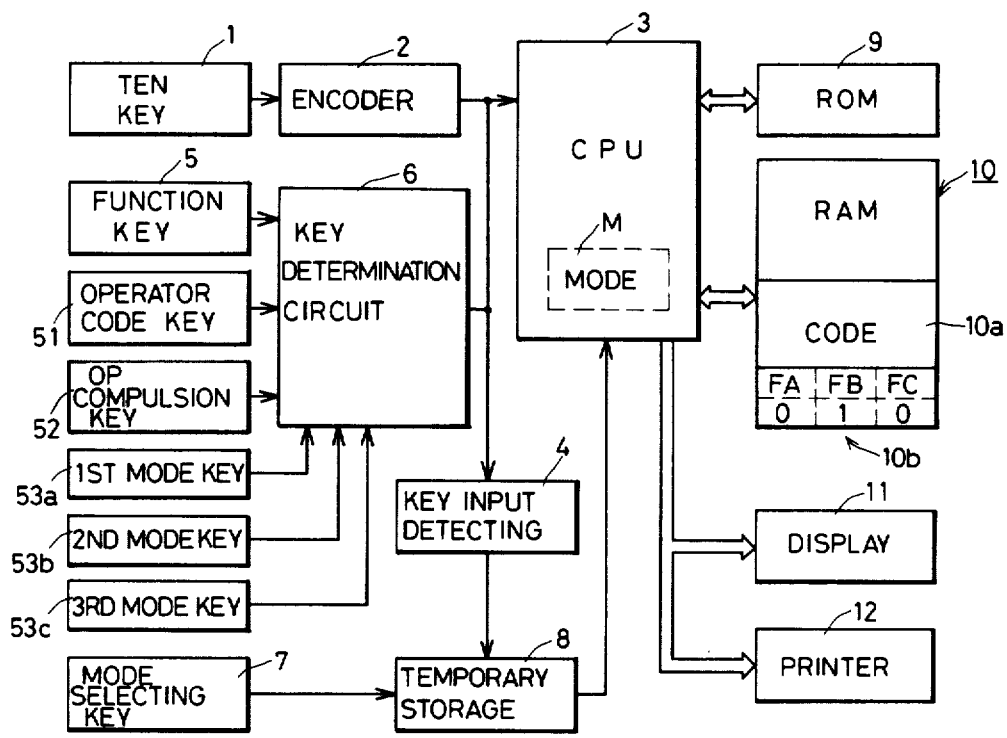

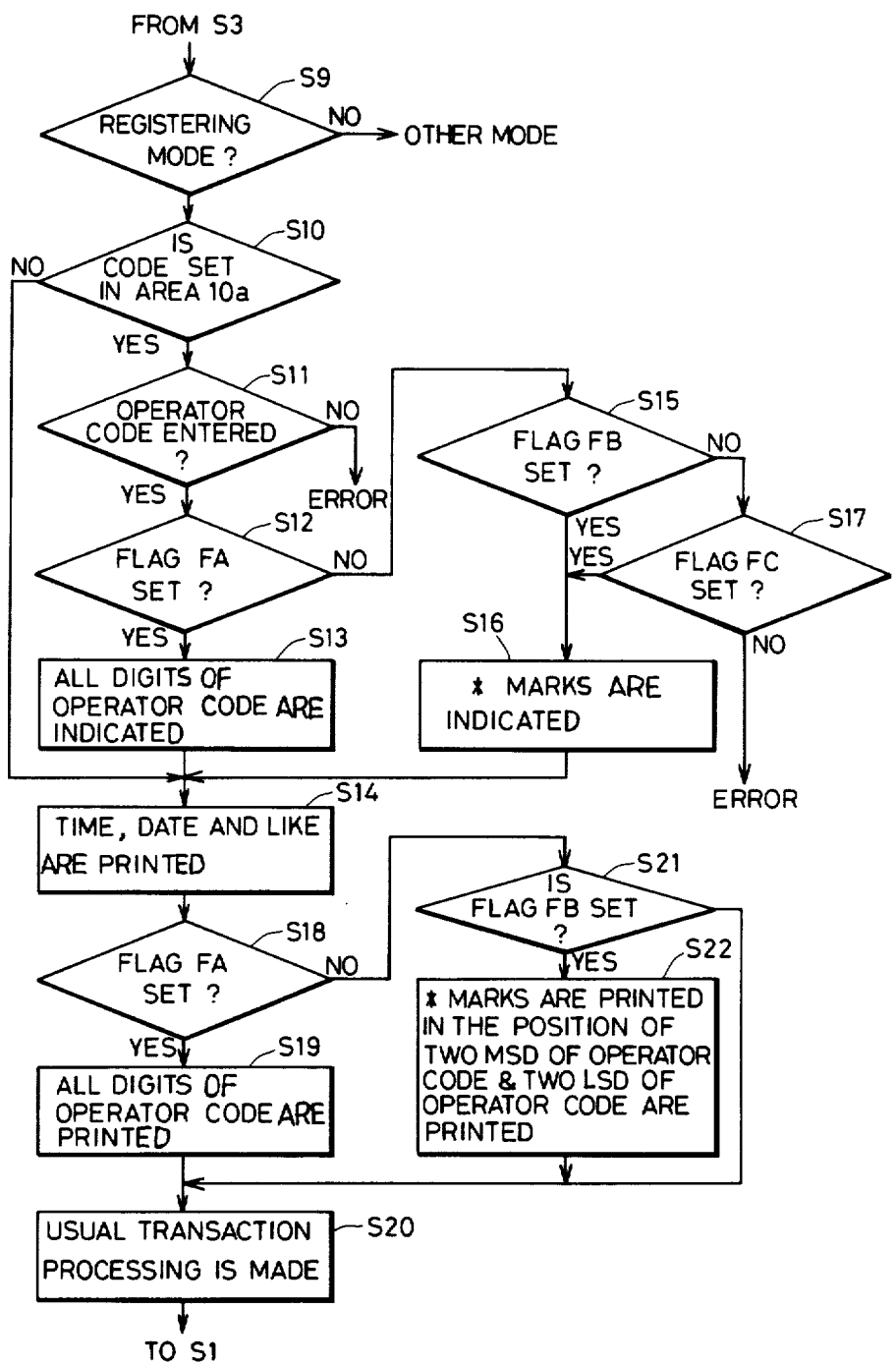

ELECTRONIC CASH REGISTER

BACKGROUND OF THE INVENTION

1. Field of the Invention

The present invention relates to an electronic cash register. More particularly, the present invention relates to an improvement of an electronic cash register in which registration of information associated with a commodity is inhibited unless an operator code identifying an operator of the cash register is entered.

2. Description of the Prior Art

In a department store, for example, a plurality of operators use a single electronic cash register to register the information associated with commodities. According to such usage of the electronic cash register, it cannot be specified which of the operators registers the information associated with commodities in the electronic cash register. Therefore, if some difficulty arises later, it is not clear who should take responsibility as to the registration of information, which has been a serious problem. Thus, in a recent electronic cash register, an operator code identifying an operator is assigned to each operator and registration processing is inhibited unless the operator code is entered in each registration processing.

However, according to the above described electronic cash register, once an operator code is entered, the operator code is displayed in a display of the electronic cash register and printed in a receipt. Thus, other operators can easily know the operator code displayed and/or printed, which means that there is a disadvantage that the operator's code cannot be kept secret. In other words, there has been a risk that another's operator code will be entered for an invalid purpose.

SUMMARY OF THE INVENTION

Accordingly, a principal object of the present invention is to provide an electronic cash register in which an indication manner and a printing manner of an operator code can be selected as desired, so that one operator can be prevented from abusing another's operator code.

Briefly stated, the present invention is directed to an electronic cash register in which a first to a third mode is set in advance and, when a registration processing is to be made, it is first determined which mode is set and in response to the determination, a manner of indication and printing of an operator code comprised of a plurality of digits can be set. More particularly, in a first mode, all of the digits of the operator code are displayed and printed, in a second mode, the indication of the operator code is inhibited and only a predetermined partial digit or digits are printed, and in a third mode, indication and printing of the operator code both are inhibited.

Accordingly, in accordance with the present invention, a desired indication manner and printing manner of the operator code can be selected by a user. Particularly, the operator code can be kept secret in the second and third modes, since the indication of the operator code is inhibited and printing of a portion or all of the operator code is inhibited. Therefore, an operator can be prevented from abusing another operator's code.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic block diagram showing an embodiment of the present invention;

FIG. 2 is a diagram showing manner of display and printing of an operator code for each mode; and FIGS. 3A and 3B are flow diagrams explaining an operation of an embodiment of the present invention.

DESCRIPTION OF THE PREFERRED EMBODIMENT

Figure 3A:
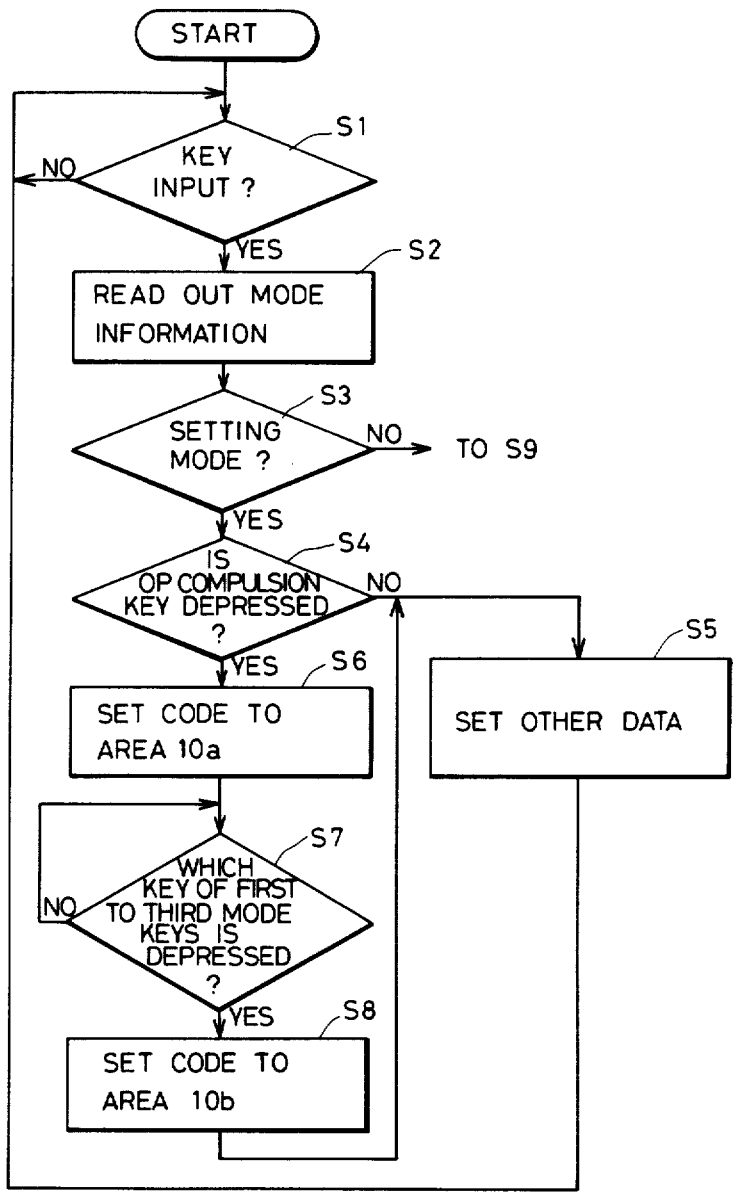

FIG. 1 is a block diagram showing an embodiment of the present invention. In FIG. 1, a digit keyboard or a ten-key 1 and a function key 5 are provided as input keys. The ten-key 1 is a key for inputting an operator code identifying a particular operator and numerical information such as the number of commodities or the price for the commodity in each transaction. The output from the ten-key 1 is encoded in an encoder 2 and then applied to a central processing unit 3. Further, the output from the encoder 2 is applied to a key input detecting circuit 4. The function key 5 is a key for inputting a function instruction. Additional function keys of particular interest to the present embodiment includes an operator code key 51, an OP compulsion key 52, a first mode selecting key 53a, a second mode selecting key 53b and a third mode selecting key 53c. The operator code key 51 is a key for instructing that the numerical information entered from the ten-key 1 just prior to entry of the key 51 is an operator code. The OP compulsion key 52 is a key for placing the electronic cash register in a mode where registration is inhibited unless an operator code is entered for each registration processing. The first to third mode selecting keys 53a to 53c are for selectively setting an indication manner and a printing manner of the operator code entered in each registration processing. The outputs from the function keys 5 and 51-53 are determined in a key determining circuit 6 and then, applied to the central processing unit 3. The output from the key determining circuit 6 is applied to the key input detecting circuit 4. A mode selecting key 7 is further provided for switching operation modes of the electronic cash register between a setting mode, a registering mode and a liquidation mode. The output from the mode selecting key 7 is applied to a temporary storage circuit or register 8. In addition, the output from the key input detecting circuit 4 is applied to the temporary storage circuit 8. More particularly, the temporary storage circuit 8 temporarily stores the mode being selected by the mode selecting key 7 when the output from the key input detecting circuit 4 is applied thereto. The output from the temporary storage circuit 8 is applied to a mode area M contained in the central processing unit 3 and is stored therein.

A read only memory (ROM) 9, a random access memory (RAM) 10, a display 11 and a printer 12 are connected to the central processing unit 3. The read only memory 9 stores an operation program as shown in FIGS. 3A and 3B, for example. The central processing unit 3 operates in accordance with the operation program stored in the read only memory 9. The random access memory 10 contains areas for storing various kinds of processing data, including storage areas 10a and 10b which are of interest to the present embodiment as will be later discussed. The area 10a stores information indicating whether a code is set or not indicating a mode in which the registration of the information associated with a commodity is inhibited unless an operator code is inputted in each registration processing (the mode is selected by the OP compulsion key 52). The area 10b comprises 3-bits, for example, the areas of the bits being used for setting flags FA, FB and FC, respectively. The flag FA represents whether a first mode is being selected by the above described first mode selecting key 53a. Similarly, the flag FB represents whether the second mode is being selected by the second mode selecting key 53b, and the flag FC represents whether the third mode is being selected by the third mode selecting key 53c. The display 11 indicates amount information and/or an operator code for each transaction. The printer 12 prints each transaction data and operator code or number on a journal to provide a copy and a receipt for a customer.

In the embodiment shown in FIG. 1, the manner of indication and printing of an operator code differs in response to the selected mode. FIG. 2 is a diagram showing the manner of indication and printing of the operator code in each mode. In the present embodiment, the operator code comprises four digits. In FIG. 2, in a first mode, the operator code as entered is displayed and printed in all digits (4 digits). In a second mode, the operator code is not displayed, and, instead, * marks are displayed in all digits. In addition, in the second mode, only two least significant digits of the operator code are printed and instead of the remaining two most significant digits of the operator code, * marks are printed. In a third mode, the operator code is not displayed and instead, * marks are displayed. In addition, in the third mode, the operator code and * marks are not printed.

FIGS. 3A and 3B are flow charts for explaining an operation of the central processing unit 3 shown in Fig. 1. Referring to FIGS. 1 to 3B, an operation of the embodiment of the present invention will be described.

First, a setting operation will be described. An operator selects a setting mode through a mode selecting key 7. Correspondingly, setting mode information is stored in the temporary storage circuit 8. Thereafter, if and when there is a key input from the ten-key 1 or the function key 5, it is determined that the key input is applied in the step S1 of FIG. 3A. Then, in the step S2, the mode information stored in the temporary storage circuit 8 is read out into the central processing unit 3 and then is stored in the mode area M. In the step S3, the central processing unit 3 determines that a mode is a setting mode based on the contents in the mode area M, and then, the program proceeds to the step S4. In the step S4, it is determined whether the OP compulsion key 52 is depressed. If and when the OP compulsion key 52 is not depressed, other data, such as price data to be set in a price table, is set in the step S5. On the other hand, if the OP compulsion key 52 is depressed, a predetermined code is set to the area 10a in the step S6. The electronic cash register is set, by having set the predetermined code in the area 10a, to be in such a mode that registration of information associated with commodities is inhibited unless an operator code is inputted in each registration processing. After the operation of the step S6, it is determined whether any of the first to third mode selecting keys 53a to 53c is depressed in the step S7. If and when any of the keys 53a to 53c is depressed, a corresponding flag is set in the area 10b in the step S8. Subsequently, the operation of the step S5 is performed.

Next, a registering operation will be described. In this case, the operator selects a registering mode through a mode selecting key 7, so that the mode information is stored in the temporary storage circuit 8. Accordingly, after the completion of the operations of the above described steps S1 and S2, it is determined that a mode is not a setting mode in the step S3 and it is determined that the mode is a registering mode in the step S9. Then, in the step S10, it is determined whether a code is set in the area 10a. If the code is set in the area 10a, it is determined whether the operator code is entered or not in the step S11. If the operator code is not entered, an error processing (such as error indication) is made. Thus, in case where the operator code is not entered, a registration processing is inhibited. On the other hand, if and when the operator code is entered, it is determined whether the flag FA is set in the step S12. If the flag FA is set, all digits of the operator code are indicated in the display in the step S13 (refer to the first mode in FIG. 2). Then, in the step S14, the data such as the time, date and the like is printed by the printer 12. If the flag FA is not set, it is determined whether the flag FB is set in the step S15. If the flag FB is set, the * marks are indicated in the display 11 in the step S16 (refer to the second mode in FIG. 2). Then, the operation of the step S14 is performed. On the other hand, if and when neither the flag FA nor the flag FB is set, it is determined whether the flag FC is set in the step S17. If the flag FC is set, the * mark is indicated in the display 11 in the step S16 (refer to the third mode in FIG. 2). If neither the flag FA, FB nor FC is set, an error processing is made.

After the operation of the above described step S14, it is determined whether the flag FA is set or not in the step S18. If the flag FA is set, all digits of the operator oode are printed in the step S19 (refer to the first mode in FIG. 2). Then, in the step S20, usual transaction processing is made. On the other hand, if the flag FA is not set, it is determined whether the flag FB is set in the step S21. If the flag FB is set, in the step S22, the * marks are printed instead of the two most significant digits of the operator code and the two least significant digits of the operator code is also printed (refer to the second mode in FIG. 2).

If and when neither the flag FA nor FB is set, the operation in the step S20 is made after the steps S18 and S21. More particularly, since the flag FC is set in this case, the operator code is not printed (refer to the third mode in FIG. 2).

If and when it is determined that the area 10a is reset in the above described step S10, the operations subsequent to the step S14 are directly made. In this case, the flags FA to FC are not set, and thus, the operation in the step S20 is performed after the steps S18 and S21.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic cash register, comprising:
   mode selecting means for selecting one of first, second and third modes, each said mode designating a different manner of printing a multidigit operator code;
   commodity associated information inputting means for introducing information associated with a commodity;

operator code inputting means for inputting a said multidigit operator code, said multidigit operator code identifying a specific operator who enters said commodity associated information, each said operator code being predetermined for a different operator;

means for registering commodity associated information introduced by said commodity associated information inputting means;

registration inhibiting instruction providing means for providing an instruction to inhibit registration of said commodity associated information unless a said operator code is inputted by said operator code inputting means;

mode storing means, responsive to said mode selecting means, for storing the said mode selected by said mode selecting means;

registration inhibiting means, responsive to said registration inhibiting instruction providing means, for inhibiting registration by said means for registering of said commodity associated information introduced by said commodity associated information inputting means when no said operator code is input from said operator inputting means;

displaying means responsive to operation of said means for registering for displaying at least said commodity associated information;

printing means responsive to operation of said means for registering for printing at least said commodity associated information;

mode determining means operatively connected to said mode storing means for determining the mode stored therein when said commodity associated information is to be registered by said means for registering; and controlling means, responsive to said mode determining means for controlling said displaying means and said printing means such that the multidigit operator code entered by said operator code inputting means is displayed by said displaying means and printed by said printing means when said first mode is stored in said mode storage means, display of said operator code by said display means being inhibited and the printing of only a partial digit or digits of the multidigit operator code by said printing means being enabled when said second mode is stored in said mode storage means, and display and printing of said operator code being inhibited when said third mode is stored in said mode storage means.

2. An electronic cash register in accordance with claim 1, which further comprises releasing means for releasing inhibition of registration caused by said registration inhibiting means.

* * * * *